United States Patent
Buning et al.

[15] 3,647,402
[45] Mar. 7, 1972

[54] GALVANICALLY METALLIZED OBJECTS HAVING A POST-CHLORINATED POLYETHYLENE SUBSTRATE AND PROCESS OF PRODUCING SAME

[72] Inventors: Robert Buning, Oberlar; Gunther Bernhardt, Hangelar, Vilicher; Egon Bierwirth, Oberlar; Werner Trautvetter, Spich, all of Germany

[73] Assignee: Dynamit Nobel AG, Troisdorf near Cologne, Germany

[22] Filed: Oct. 8, 1968

[21] Appl. No.: 765,963

Related U.S. Application Data

[63] Continuation-in-part of Ser. No. 752,738, Aug. 15, 1968, abandoned.

[30] Foreign Application Priority Data

Oct. 13, 1967 Germany................................D 54342

[52] U.S. Cl. ..........................29/195, 117/71 R, 117/138.8 E, 204/20, 260/94.9 H, 260/897 C
[51] Int. Cl. ........................................................C23b 5/60
[58] Field of Search..........................117/138.8 E, 160, 71 R; 260/897, 94.9 H; 29/195 P; 204/20, 22, 30

[56] References Cited

UNITED STATES PATENTS

| | | | |
|---|---|---|---|
| 2,801,447 | 8/1957 | Wolinski | 117/138.8 E |
| 3,470,269 | 9/1969 | Dobovsek | 260/897 |
| 3,085,082 | 4/1963 | Baer et al. | 260/891 |
| 3,367,792 | 2/1968 | Levine | 117/160 |
| 3,438,798 | 4/1969 | Baudrand et al. | 117/160 |
| 3,470,269 | 9/1969 | Dobovsek | 260/897 C |
| 3,485,643 | 12/1969 | Zeblisky et al. | 117/160 |

OTHER PUBLICATIONS

Narcus, Metallization of Plastics, Reinhold Publishing Corp., New York, 1960 p. 14

*Primary Examiner*—Murray Katz
*Assistant Examiner*—Ralph Husack
*Attorney*—Burgess, Dinklage & Sprung

[57] ABSTRACT

Galvanically metallized thermoplastic shaped articles comprising post-chlorinated polyethylene or mixtures thereof with polyvinyl chloride and/or post-chlorinated polyvinyl chloride.

8 Claims, No Drawings

GALVANICALLY METALLIZED OBJECTS HAVING A POST-CHLORINATED POLYETHYLENE SUBSTRATE AND PROCESS OF PRODUCING SAME

This application is a continuation-in-part of application, Ser. No. 752,738, filed Aug. 15, 1968, and abandoned by Express Abandonment filed concurrently herewith.

The subject of the present invention is a process for metallizing objects made from thermoplastics. The process is especially characterized by the fact that the objects are made of chlorinated polymers of ethylene.

It is known that it is not possible by electrochemical methods to metallize homopolymers of vinyl chloride or ethylene and produce a genuinely permanent bond between the metal and the plastic. The adhesion strengths achieved by prior art methods on polyvinyl chloride (PVC) and on polyethylene are less than 0.2 kg. per 25 mm. of width according to German engineering standard DIN 40802. For practical purposes, however, the adhesion strength must be greater than 1.0 kg. per 25 mm. of width. The metallization of PVC and of polyethylene has resulted merely in a jacketing of these polymers.

It is therefor an object of this invention to provide a novel process for metallizing polymers having hydrocarbon backbones.

It is another object of this invention to provide a novel metallized product.

Other and additional objects of this invention will become apparent from a consideration of this entire specification, including the claims hereof.

In accord with and fulfilling these objects, one aspect of this invention resides in the application of an electrochemical metallized coating onto a shaped article of post-chlorinated polyethylene by conventional metallizing techniques.

It has surprisingly been found that considerably better strengths of adhesion of metal coatings on polyethylene can be achieved if the metallization of objects made of such thermoplastic is performed according to known processes, but the objects consist of chlorinated polymers of ethylene. The chlorine content of the chlorinated polymers of ethylene ranges advantageously from 15 to 65 percent and preferably from 25 to 55 percent by weight, and the molecular weight of the ethylene polymers used for the chlorination is preferably greater than 15,000. Both low-pressure and high-pressure types of polyethylene can be used for the preparation of the chlorinated ethylene, which polymers can be prepared by known processes. The density of the polyethylenes used for the chlorination is not critical. In addition to polyethylene, copolymers of ethylene can be used, such as copolymers with other olefins such as propylene, butene-1, etc.

PVC can also be admixed with the chlorinated polymers of ethylene. The PVC may be contained in the shaped objects in a quantity of 0.5 to 80 percent, preferably 10 to 40 percent, by weight. Both tactic and atactic PVC are suitable as additives. The K values of the added PVC types can vary within wide limits. The quantity and K value of the added PVC's are governed substantially by the required mechanical properties of the shaped articles being metallized.

Post-chlorinated PVC can also be added to the chlorinated ethylene polymers, and it can be used in the same quantity and in the same manner as the PVC additive. PVC and post-chlorinated PVC are interchangeable with one another in any desired amounts within the stated limits. Both may be used simultaneously. The chlorine content of the post-chlorinated types of PVC can range from 57 to 73 percent, and preferably from 60 to 67 percent, by weight. The post-chlorination can be performed according to known methods. Both tactic and atactic polyvinyl chloride can be used as the starting products for the post-chlorination.

The fact that post-chlorinated polymers of ethylene are suitable is surprising, since on the one hand polyethylene is made similar to PVC in its chlorine content by the chlorination process, and on the other hand it is known that PVC homopolymers cannot be metallized by electrochemical methods to produce a genuinely permanent bond between the metal and the plastic. The adhesion strengths achieved are too low for practical purposes, as already stated. Chlorinated polyethylene, however, can be metallized surprisingly well, as is shown by the following examples.

It is also surprising that compounds made from chlorinated polymers of ethylene and PVC have good metallizing qualities, because it is known that the addition of PVC to acrylonitrile-butadiene-styrene (ABS) polymers considerably reduces the metallizability of the latter. Even in the case of ABS contents of over 50 percent by weight, and the simultaneous presence of PVC, the adhesion strengths according to DIN 40802 only amount up to about 1.0 kg. per 25 mm. of width. It is therefore surprising that the metallizability of objects made from chlorinated polymers of ethylene is improved by the addition not only of PVC but also of post-chlorinated PVC.

The working of the molding compounds prepared from chlorinated polymers of ethylene, with the addition of PVC and/or post-chlorinated PVC, if desired, can be performed by known methods. The additives customarily used with chlorinated polymers of ethylene, PVC and post-chlorinated PVC, such as the usual stabilizers, can be mixed in with the molding compounds in the usual quantities before they are fabricated.

The metallization can be performed in a known manner by the following procedure, which can be modified in a known manner according to the object being fabricated:

1. Degreasing: e.g., with 40% NaOH.
2. Etching: e.g., with chromosulfuric acid (40 g. $K_2Cr_2O_7$ + 20 g. $H_2O$ + 500 ml. concentrated sulfuric acid).
   Etching temperatures: 50° to 70° C.; etching time ranges from 30 to 90 minutes.
3. Neutralizing: e.g., with 20 percent aqueous solution of $NaHSO_3$.
4. Sensitizing: e.g., with stannous chloride solution (35 g. $SnCl_2$ + 50 cc. conc. HCl + 1,000 cc. $H_2O$).
5. Activation: e.g., with silver nitrate solution (2 g. $AgNO_3$ in 50 cc. $H_2O$ + 10 cc. $NH_4OH$ (conc.), plus water to make 1,000 cc.).
6. Chemical production of the ground coat: e.g., immersion of plastic in a solution prepared in a ratio of 1:1 by volume of solution A and solution B:

| Solution A | 31.8 g. copper sulfate |
| --- | --- |
| | 8.2 g. nickel chloride |
| | 76.6 g. 37% aqueous formaldehyde solution |
| | 532 cc. of water |
| Solution B | 23.9 g. NaOH |
| | 95.5 g. potassium-sodium tartrate |
| | 8.2 g. $Na_2CO_3$ |
| | 532 cc. of water |

The chemical preparation of a nickel ground coat is performed, e.g., at 90° C., by immersing the plastic into the following solution:

30 g. nickel chloride
10 g. sodium hypophosphite
100 g. sodium citrate and
50 g. ammonium chloride dissolved in water, and water added to make 1,000 ml., and then adjusted with $NH_4OH$ to pH 8-10.

The chemical preparation of a silver ground coat can be performed in a known manner by immersing the object into a silver salt solution to which a reducing agent has also been added.

7. Copper electroplating is performed, for example, in an acid copper sulfate bath composed of 250 g. $CuSO_4$, 100 g. $H_2SO_4$ and 1,000 ml. of water, at a voltage of 0.5 volt. Other metals, such as Ag, Au, Ni, Cr or the like can be electroplated in an appropriate manner onto the ground coat of copper and/or nickel and/or silver.

The advantages of the process of the invention are demonstrated by the following examples:

EXAMPLES 1a–c

A low-pressure polyethylene having a molecular weight of about 200,000 was chlorinated in heterogeneous phase at atmospheric pressure with molecular chlorine. Monochlorbenzene was used as the swelling agent. The chlorination was performed in a tubular reactor containing no packing. Ultraviolet light served as the activator of the chlorination process. The chlorination was performed at 90° C. After the desired chlorine content was reached the reaction was stopped and the chlorination products from the mixture were directly freed of monochlorbenzene by steam distillation. The centrifuged specimens were then dried in a vacuum drying tank at 60° C.

After the addition of 2 weight percent of a tin stabilizer that is commercially obtainable under the name Advastab M 17, $(n-C_4H_9)_2Sn(S-CH_2-COO-C_8H_{17})_2$, sheets 4 mm. thick were pressed at temperatures between 150° and 190° C. and then metallized in the manner described above. The ground coat was strengthened by electroplating with copper in the manner also described. The copper film had a thickness of 40 to 50 microns. Then the strength of adhesion of the metal films obtained was determined according to DIN 40802. The values obtained are shown by the following Table 1.

TABLE 1

| Example | Weight percent of Cl | Strength of adhesion [1] |
| --- | --- | --- |
| 1a | 20 | 6.2 |
| 1b | 25 | 7.9 |
| 1c | 45 | 10.0 |

[1] Per DIN 40802 in kg. per 25 mm. of width.

EXAMPLES 2a–c

A low-pressure polyethylene of the stated molecular weight was chlorinated according to Example 1, until it had a chlorine content of 39.5 percent. Varying amounts of this chlorinated polyethylene were mixed with a polyvinyl chloride of the suspension type having a K value of 68. After the addition of 2 weight percent of the above-named stabilizer, sheets 4 mm. thick were prepared and metallized as in Example 1. The strengths of adhesion of the metal films obtained are shown in the following Table 2.

The strengths of adherence of the metal films to the surfaces of the shaped plastic articles as illustrated in the examples was observed to exist independent of whether the base layer comprises nickel or copper and the electrolytically produced plating layer of approximately 40 micron thickness comprised copper, nickel or chromium.

TABLE 2

| Example | Weight-percent [1] | Strength of adhesion [2] |
| --- | --- | --- |
| 2a | 30 | 8.6 |
| 2b | 50 | 6.9 |
| 2c | 75 | 4.5 |

[1] Of PVC in mixture.
[2] Per DIN 40802 in kg. per 25 mm. of width.

What is claimed is:

1. A chemo-galvanically metal coated shaped article comprising a thermoplastic substrate; a ground coat of nickel, copper, or silver thereon and an electro plate second layer of copper, silver, gold, nickel or chromium of said ground coat; wherein said thermoplastic substrate is an ethylene polymer which has been post-chlorinated in the swollen condition, prior to the formation of said shaped article therefrom to a chlorine content of about 15 to 65 percent.

2. A shaped article as claimed in claim 1 wherein said substrate is a mixture of 0.5 to 80 percent polyvinyl chloride and said post-chlorinated polyethylene.

3. A shaped article as claimed in claim 2, wherein said polyvinyl chloride is a mixture of post-chlorinated polyvinyl chloride and nonpost-chlorinated polyvinyl chloride.

4. A shaped article as claimed in claim 2 wherein said post-chlorinated polyethylene has a chlorine content of 25 to 55 weight percent.

5. A shaped article as claimed in claim 2 wherein said polyvinyl chloride is post-chlorinated.

6. A shaped article as claimed in claim 2 wherein the polyvinyl chloride content of said substrate is about 10 to 40 weight percent.

7. A shaped article as claimed in claim 1 wherein said post-chlorinated ethylene polymer is a copolymer of ethylene with another olefin.

8. The process of producing an article as claimed in claim 1 comprising forming an ethylene polymer, swelling said ethylene polymer, chlorinating said swollen ethylene polymer to 15 to 65 weight percent chlorine content; forming a shaped article of said post-chlorinated ethylene polymer; dipping said shaped article into a solution of a salt of at least one metal selected from the group consisting of copper, nickel, and silver, which solution contains a reducing agent therein, whereby forming a thin coating of said metal thereon; and thereafter electroplating a layer of copper, nickel, silver, gold or chromium onto said shaped article over said thin coating of metal thereon.

* * * * *